US008928163B2

(12) United States Patent
Arlaban Gabeiras et al.

(10) Patent No.: US 8,928,163 B2
(45) Date of Patent: Jan. 6, 2015

(54) SYSTEM AND PROCESS FOR CONTROLLING ACTIVE POWER IN A POWER GENERATION PLANT

(75) Inventors: Teresa Arlaban Gabeiras, Navarra (ES); Oscar Alonso Sadaba, Navarra (ES); Jose Miguel Garcia Sayes, Navarra (ES); Ricardo Royo Garcia, Navarra (ES); Miguel Nuñez Polo, Navarra (ES)

(73) Assignee: Acciona Windpower, S.A., Navarra (ES)

( * ) Notice: Subject to any disclaimer, the term of this patent is extended or adjusted under 35 U.S.C. 154(b) by 283 days.

(21) Appl. No.: 13/153,496

(22) Filed: Jun. 6, 2011

(65) Prior Publication Data

US 2012/0203384 A1  Aug. 9, 2012

(30) Foreign Application Priority Data

Jun. 4, 2010 (ES) .................................. 201030868

(51) Int. Cl.
*F03D 9/00* (2006.01)
*H02P 9/04* (2006.01)
*H02J 3/06* (2006.01)
*H02J 3/38* (2006.01)

(52) U.S. Cl.
CPC .. *H02J 3/06* (2013.01); *H02J 3/386* (2013.01); *Y02E 10/763* (2013.01)
USPC ............................................. 290/44; 290/55

(58) Field of Classification Search
USPC .................................................. 290/44, 55
See application file for complete search history.

(56) References Cited

U.S. PATENT DOCUMENTS

| 4,320,306 | A * | 3/1982 | Kohga et al. .................... 307/51 |
| 4,742,288 | A * | 5/1988 | Sugimoto et al. ............. 318/818 |
| 6,559,561 | B1 * | 5/2003 | Angquist ....................... 307/105 |
| 6,794,855 | B2 * | 9/2004 | Shimomura et al. ............ 322/59 |
| 6,891,281 | B2 | 5/2005 | Wobben |
| 7,372,173 | B2 | 5/2008 | Lutze et al. |
| 8,097,971 | B2 * | 1/2012 | Ichinose et al. .................. 290/44 |
| 8,324,751 | B2 * | 12/2012 | Yasugi et al. .................... 290/44 |
| 8,610,298 | B2 * | 12/2013 | Acedo Sanchez et al. ..... 290/44 |
| 2003/0057924 | A1 * | 3/2003 | Shimomura et al. ............ 322/28 |
| 2007/0085343 | A1 * | 4/2007 | Fortmann ........................ 290/44 |
| 2008/0030027 | A1 * | 2/2008 | Erdman et al. ............. 290/40 R |
| 2009/0234510 | A1 * | 9/2009 | Helle et al. ..................... 700/287 |
| 2009/0278354 | A1 * | 11/2009 | Ichinose et al. .................. 290/44 |
| 2010/0176769 | A1 * | 7/2010 | Benchaib et al. ............. 323/205 |
| 2010/0194357 | A1 * | 8/2010 | Benchaib et al. ............. 323/205 |
| 2010/0241280 | A1 * | 9/2010 | Garcia Barace et al. ..... 700/287 |
| 2010/0292863 | A1 * | 11/2010 | Benchaib et al. ............. 700/298 |
| 2011/0057445 | A1 * | 3/2011 | Acedo Sanchez et al. ..... 290/44 |

(Continued)

*Primary Examiner* — Pedro J Cuevas
(74) *Attorney, Agent, or Firm* — Gardner Groff Greenwald & Villanueva, PC

(57) ABSTRACT

The present invention describes a process for controlling the active power injected into the grid by a generating plant for contributing to the stability of the power grid in the event of frequency variations where, in response to a deviation in grid frequency, each generating unit calculates an active power variation parameter generated based on a first parameter stored in said generating unit, said first parameter being representative of a respective contribution of said generating unit to a required variation in total active power of the generating plant, and where a central control unit of the generating plant connected to each generating unit updates the value of the first parameters when changes are produced therein.

19 Claims, 6 Drawing Sheets

(56) References Cited

U.S. PATENT DOCUMENTS

| | | |
|---|---|---|
| 2011/0156389 A1* | 6/2011 | Arlaban Gabeiras et al. .. 290/44 |
| 2011/0204630 A1* | 8/2011 | Arinaga et al. ................. 290/44 |
| 2012/0035775 A1* | 2/2012 | Garcia ......................... 700/287 |
| 2012/0061960 A1* | 3/2012 | Yasugi et al. ................... 290/44 |
| 2012/0061961 A1* | 3/2012 | Yasugi et al. ................... 290/44 |
| 2012/0161444 A1* | 6/2012 | Tarnowski ..................... 290/44 |
| 2014/0159367 A1* | 6/2014 | Yin ................................ 290/44 |
| 2014/0176090 A1* | 6/2014 | Harjeet et al. ................ 323/209 |
| 2014/0203788 A1* | 7/2014 | Andrejak et al. .............. 322/14 |

\* cited by examiner

SYSTEM AND PROCESS FOR CONTROLLING ACTIVE POWER IN A POWER GENERATION PLANT

CROSS REFERENCE TO RELATED APPLICATIONS

This nonprovisional application claims priority upon ES application serial no. P201030868 filed on Jun. 4, 2010 and is hereby incorporated by this reference in its entirety for all of its teachings.

OBJECT OF THE INVENTION

The object of the present invention is a process for controlling the active power injected into the grid by a generating plant for contributing to the stability of the power grid in the event of frequency variations. Additionally, another object of the invention is a generating unit and a generating plant capable of carrying out said process.

BACKGROUND OF THE INVENTION

The operation of power grids is defined by certain rated operating parameters, normally voltage and frequency. The existence of imbalances between generated power and consumed power at a given time causes deviations in grid operating frequency. In particular, when generated power exceeds consumed power, grid frequency increases above its rated value. If, on the contrary, generated power is less than consumed power, frequency decreases in relation to its rated value. If said deviations are not quickly rectified, the disconnection of large grid areas may become necessary.

For the purpose of collaborating in the limitation of power grid frequency, conventional generating plants such as thermal or nuclear generating plants have means to, based on power grid operator demand, increase or decrease the active power generated in accordance with power grid conditions at a given time. To date, distributed generation plants (for example, those based on renewable energy such as wind or solar energy) have not been required to collaborate in grid stability. However, in view of the spectacular increase in installed power in this type of generating plants in recent years, the active power control requirements imposed by the grid operator are extending to distributed generation plants.

Grid operator requirements in terms of active power variation in response to deviations in frequency towards distributed generation plants vary as, depending on the type of power grid (higher or lower power rating) in a given area, the grid operator establishes more or less stringent requirements for the generators connected to said grid. For example, the maximum power limits established for primary frequency regulation may range between 1.5% and 100% of rated power. The response time for this also varies greatly.

At present, two basic types of control structures are used to adapt the active power generated to grid frequency. A first control structure used in wind farms is based on the local control of the active power generated by each individual wind turbine. An example of this type of structure is U.S. Pat. No. 6,891,281, wherein each wind turbine has a local controller that limits its power output in accordance with grid frequency, regardless of the power output of other turbines. Said controller has the same characteristics in all the wind turbines of the wind farm, in such a manner that, for the same wind and frequency conditions, power variation will be identical in all the wind turbines. However, this control strategy has the drawback that there is no supervision to ensure that the overall efficiency of the wind turbine system is adequate, due to which farm-level errors could occur in the efficiency required by the grid operator. Additionally, depending on the operator's requirements, the variation in active power of each wind turbine can be so small, for example a variation of barely a few kilowatts, that the wind turbine power control systems are unable to guarantee sufficient accuracy, for example due to the existence of dirt on the blade surfaces, speed and power metering device tolerances, etc. At global farm level, this can result in nonfulfilment of the grid operator's requirements.

The second known control structure is based on the centralised control of the wind farm, i.e. a central control unit sends the individual power commands to each wind turbine in real time in accordance with the grid frequency measurement. An example of this strategy is U.S. Pat. No. 7,372,173, where the central control unit measures grid frequency and, when it detects the presence of an error therein with regard to the reference value, sends the necessary active power commands to each wind turbine in real time to modify wind farm power output in accordance with the grid operator's requirements. These systems achieve a coordinated response from the farm, eliminating errors in wind turbine response. However, due to farm control cycles and delays in communications between the central control and the wind turbines, the response speed of the centralised systems is much slower than that of systems based on a local controller in each wind turbine. The delay between the moment in which a grid event occurs (such as for example a deviation in frequency) and the moment in which the wind turbines start responding to the farm control commands usually exceeds 100 ms. This can represent a serious drawback, as the grid operator occasionally requires faster variation in the active power generated by a wind farm.

DESCRIPTION OF THE INVENTION

The inventors of this application have developed a novel process for controlling the active power generated by a wind farm that combines the fast response characteristic of individual control systems and the coordination characteristic of the central control systems.

A first aspect of the present invention describes a process for controlling the active power generated by a distributed generation plant formed by at least two generating units where, in response to a deviation in grid frequency, each generating unit calculates its own active power variation command generated in accordance with a parameter received from a central control unit and stored in said generating unit, where the first parameter is representative of the contribution of each specific generating unit to a total required variation in the active power of the power generation plant. In this manner, each generating unit responds immediately to deviations in grid frequency in a similar manner to the local control-based strategies of the earlier art, as the first parameter is stored in the generating unit at all times.

The total active power requirement of a farm is normally imposed by the grid operator, although it can also be imposed by the generating plant operating company or any other organisation. Therefore, in this document the term "grid operator" makes reference to both the operator, strictly speaking, and to any other organisation that could require variations in the power generated by the generating plant.

Additionally, in order to ensure coordination of the variations in power output of the different generating units, in the present invention a central control unit connected to each generating unit updates the value of the first parameters indicative of the contribution to the variation in total power output of each of the different generating units when changes are produced therein. The changes in the first parameters are not necessarily associated with changes in grid frequency, but to changes in the operating conditions of the turbines such as, for example, changes in wind conditions, stops associated with maintenance work, component temperature, number of equivalent hours working at rated power, etc. In this manner, the central control unit does not wait for a deviation to occur in grid frequency to calculate the first parameters, as opposed to the state of the art wherein the central control calculates new parameters in the event of a change in frequency. Therefore, when a deviation in grid frequency occurs, each generating unit as of the first parameter already stored in its control unit responds to the detection of the deviation in frequency, modifying the active power consequently generated. In this manner, the central control ensures a coordinated response at generating plant level to fulfil the grid operator's requirements, but without the drawbacks of the centralised systems of the earlier art based on real-time transmission of the parameters, where the delay produced between the detection of the frequency error and the calculation and transmission of parameters by the central control unit until receipt thereof by the generating units limits the generating plant's response speed.

In other words, the first parameters are sent to the generating units even in situations where grid frequency is stable and substantially equal to its reference value, i.e. at times when no variation in generated power is required. However, in this manner the generating units that form part of the generating plant are constantly informed of their respective contribution to the variation in total active power in the event of a potential grid frequency event. If this should occur, the generating units will follow the commands of the active power regulator built into its own control unit, duly updated with the first parameter indicative of its corresponding contribution.

The first parameter may differ between the different units of the generating plant, in one case the first parameter of a unit being 100% and the first parameter of the rest null or all the first parameters identical or any other possible distribution. In this manner, the central control seeks a compromise for deciding the first parameters indicative of the contribution, avoiding situations where the power variation references of each wind turbine are so small that they cannot be fulfilled due to accuracy errors, as in the case of the local control of the state of the art, or are so high that they can represent a problem in terms of wind turbine loads.

The active power variation requirement of a generating plant based on the frequency deviation in relation to rated frequency may be defined by the operator either by a table of predetermined values or by a transfer function, which can include proportional, integral or differential terms. For example, the power variation requirement of a generating plant can be expressed in per unit using an expression in the following manner:

$$\frac{\Delta P_T}{P_{base\_T}} = \frac{\Delta f}{f_{ref}} K_T$$

where:
$\Delta P_T$ is the variation in total power output of the generating plant in per unit.
$P_{base\_T}$ is the power in relation whereto the variation in total power output of the generating plant is expressed. Depending on the operator's requirements, it may correspond to the total rated power of the generating plant or to the available power, understanding as such the maximum power that the plant can generate at a given time depending on the atmospheric conditions (for example, wind in a wind farm or solar radiation in a photovoltaic park).
$\Delta f$ is the deviation in frequency in relation to a reference frequency, calculated as the difference between the measured grid frequency and the reference frequency.
$f_{ref}$ is reference frequency of the power grid, which usually coincides with the rated grid operation frequency.
$K_T$ is a dimensionless proportionality constant between the frequency error and variation in power output with respect to the reference values, i.e.:

$$K_T = \frac{\frac{\Delta P_T}{P_{base\_T}}}{\frac{\Delta f}{f_{ref}}}$$

Alternatively, the power output variation requirement of a generating plant may be given in absolute values:

$$\Delta P_T = \Delta f \cdot K_T$$

Whereupon:
$\Delta P_T$ is the variation in generating plant power output in absolute values.
$\Delta f$ is the deviation in grid frequency with respect to the reference frequency.
$K_T$ is a proportionality constant [W/Hz] between frequency error and variation in power output in absolute values based on the grid operator's requirement.

Bearing this in mind, there are two basic methods of defining the first parameter representative of the contribution of each unit to the variation in total plant power output:

a) According to a particular embodiment of the invention, the first parameter of a generating unit is defined as the relationship between the active power variation command of said generating unit and the variation in total active power of the generating plant required by the grid operator. In this case, the first parameter is called "dynamic contribution value." For example, if the power variation requirement imposed by the operator is a linear transfer function such as that previously described, it could be expressed as follows:

$$\Delta P_i = C_i \cdot \Delta P_T = C_i \cdot K_T \cdot \Delta f,$$

$$\text{i.e., } C_i = \frac{\Delta P_i}{\Delta P_T} = \frac{\Delta P_i}{K_T \cdot \Delta f}$$

where:
$C_i$ is the dynamic contribution value of the generating unit i;
$\Delta P_i$ is the variation in power output of the generating unit i.

Consequently, when the dynamic contribution value $C_i$ of the generating units is used, there should not only be means for monitoring grid frequency, but also for storing the active power variation requirement $K_T$ imposed by the grid operator on the wind farm, whether in the form of a table, a transfer function or other. The active power requirement of the operator $K_T$ can be either loaded on a turbine-by-turbine basis or sent to the generating units from the central control unit if changes are made thereto.

Evidently, the sum of the dynamic contribution values $C_i$ of all the generating units shall be the unit, i.e. one hundred percent, in such a manner that the sum of the contributions of all the generating units will be the total power variation required from the generating plant. Mathematically, this can be expressed as:

$$\Sigma \Delta P_i = \Sigma C_i \cdot \Delta P_T = \Delta P_T, \text{ where } \Sigma C_i = 1$$

b) According to another preferred embodiment of the invention, the first parameter is defined as the relationship between the active power variation parameter of the generating unit and the difference between grid reference frequency and measured frequency. By using the previously described active power variation parameter, this can be mathematically expressed as:

$$\Delta P_i = \Delta P_T \cdot C_i = \Delta f \cdot K_T \cdot C_i = \Delta f \cdot K_i,$$

i.e., $K_i = \dfrac{\Delta P_i}{\Delta f}$

That is, in this case the first parameter is calculated as $=K_i=K_T \cdot C_i$. Therefore, in this particular embodiment the active power variation requirement $K_T$ imposed by the grid operator is already implicit in each first parameter $K_i$ sent by the central control unit, not requiring storage thereof in the generation units.

In general, the power variation requirement of the generating plant $\Delta P_T$ may be any function dependent upon frequency error and time:

$$\Delta P_T = f_T(\Delta f, t)$$

And the power variation with which it contributes a generating unit $\Delta P_i$:

$$\Delta P_i = f_i(\Delta f, t) = C_i \cdot f_T(\Delta f, t)$$

Additionally, as explained earlier herein, the power variation requirement imposed by the grid operator usually includes increasing the power generated if grid frequency is less than the reference frequency. However, distributed generation plants based on renewable energy such as wind or photovoltaic energy generally operate at their maximum energy production capacity. Therefore, in order for the distributed generation units to be capable of increasing their power output, they should not operate at maximum capacity i.e. with regard to their usual operating regime. According to this, "static regulation" is that which is carried out for a much longer period of time, hours or even days, in relation to "dynamic regulation", where the response time is within the range of minutes or seconds.

According to another particular embodiment of the invention, each generating unit calculates an active power static reduction command generated in accordance with a second parameter stored in said generating unit, said second parameter being representative of the contribution of said specific generating unit to the static reduction in the total active power of the generating plant required by the grid operator. As in the case of the first parameter, the central control unit updates the value of the second parameter of each generating unit only when changes are produced therein. The second parameter receives the name of "static contribution value."

Mathematically, said static contribution value $C_{i\_stat}$ can be expressed as:

$$\Delta P_{i\_stat} = C_{i\_stat} \cdot \Delta P_{T\_stat},$$

i.e., $C_{i\_stat} = \dfrac{\Delta P_{i\_stat}}{\Delta P_{T\_stat}}$

Evidently, the sum of the static power reserve of all the generating units must be the total static power reserve of the plant:

$$\Sigma \Delta P_{i\_stat} = \Sigma C_{i\_stat} \cdot \Delta P_{T\_stat} = \Delta P_{T\_stat}, \text{ i.e. } \Sigma C_{i\_stat} = 1$$

where:

$\Delta P_{i\_stat} < 0$ $\Delta P_{T\_stat} < 0$

In this manner, in those situations where the grid operator requests the possibility of increasing the power generated by the generating plant in the event that grid frequency falls below its reference value, the central control unit of the generating plant (or even a remote control centre) will send the generating units their corresponding static contribution value in order to guarantee the static reduction of active power.

According to a preferred embodiment of the invention, the static contribution value $C_{i\_stat}$ and the dynamic contribution value $C_i$ are identical.

In the event that the connection between the central control unit and the generating units is lost or the central control unit itself malfunctions, the generating units will continue functioning with the last values received from the indicative parameters of the respective contribution, both static and dynamic, to the variation in power plant output. Alternatively, the generating units will adopt the same value indicative of the contribution, i.e. $C_i = 1/(\text{number of generating units})$, in the event that power output is identical in all of these. In both cases, in the event of loss of a central control, the generating units will continue contributing to the support of grid frequency.

According to another preferred embodiment of the invention, the generating unit is a wind farm and the generating plant is a group of wind farms.

Alternatively, in another preferred embodiment, the generating unit is a wind turbine and the generating plant is a wind farm. In this case, in order to determine the value of the static and dynamic contribution values of each wind turbine, the central control unit preferably takes into account operating parameters such as the temperatures of the components of the wind turbines and/or mechanical loads, sending new values when wind turbine conditions suffer modifications. For example, it is possible to concentrate the static power reserve in those wind turbines with higher workloads by sending them a high static contribution value, simultaneously maintaining those wind turbines without problems functioning at full capacity through a low or null static contribution value.

Additionally, the active power static and dynamic reduction requirements imposed by the operator may be referenced to the rated power of the farm or to its available power. However, as opposed to a conventional generating plant, for example, a thermal power plant, the available power in a wind farm is not constant, as it depends on the wind. In order to solve this problem, according to a preferred embodiment, the wind turbines calculate their available power and send it to the central control unit.

The power available in the wind turbines can be calculated based on wind speed, wind turbine rotational speed, generated power and blade pitch angle position measurements, or by using blade power capture coefficients or combining both estimates. If blade power capture coefficients are used, there are different factors which can affect their accuracy, such as for example dirt on the blade surfaces, air density, ambient temperature, etc. Therefore, wind turbines preferably calculate updated values of said coefficients at times in which the active power variation and static power reduction commands are null.

In an alternative embodiment to the foregoing, in order to calculate the available power the central control unit establishes a calculation cycle consisting of sending some of the wind turbines which are functioning in reserve mode a parameter for calculating available power. When they receive said parameter, the control unit of each wind turbine switches from reserve mode to normal mode, i.e. maximising energy capture, for a predetermined period of time, for example 10 or 30 s, in order to calculate a filtered power measurement indicative of the available power. Subsequently, they send the central control unit the resulting filtered power measurement corresponding to available power. In order to compensate the momentary deviations when certain wind turbines are calculating their available power, the central farm control sends updated static reduction coefficient value parameters to the rest of the wind turbines. The same operating procedure is applicable in the case of a generating plant wherein the generating units are of the solar photovoltaic type.

A second aspect of the invention is intended for a wind turbine capable of carrying out the previously described process, which comprises a power regulator connected to a central control unit of the wind farm and means for measuring power grid frequency, where the power regulator is configured to calculate an active power variation command generated by said wind turbine, in accordance with a first parameter ($C_i$, $K_i$) indicative of its respective contribution to the variation in total power output and of the deviation between a reference frequency and the measured frequency.

The invention is also intended for a wind farm comprising at least two wind turbines such as that described and which also comprises a communication network which connects a central control unit of the wind farm to the power regulators of at least two wind turbines, where the central control unit is configured to send, via the communication network, new values of the first parameters ($C_i$, $K_i$) indicative of the contribution to the variation in total power output to the control units of said at least two wind turbines.

PREFERRED EMBODIMENT OF THE INVENTION

An example of embodiment of the present invention making reference to the attached figures is described below.

Figure 1:
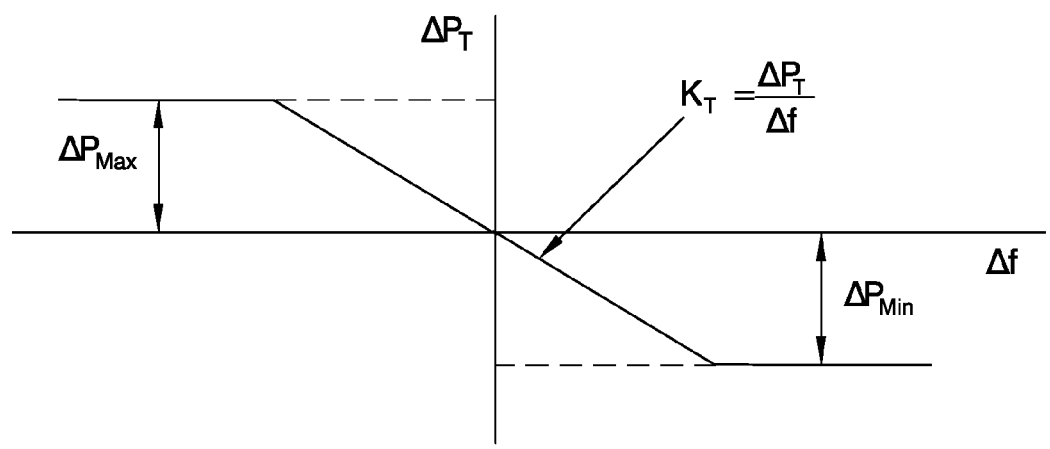
FIG. 1 shows an example of a power variation requirement of a generating plant.

FIG. 1 graphically shows an example of an active power variation requirement in response to deviations in grid frequency. It can be observed that the variation in active power is proportional to the magnitude of the deviation in frequency up to maximum power output variation values $\Delta P_{Max}$ and $\Delta P_{Min}$. In the examples described below, the active power linear variation requirement of FIG. 1, characterised by $K_T$ will be used, although it is understood that said requirement could alternatively be defined by means of tables or other types of transfer functions.

Figure 2:
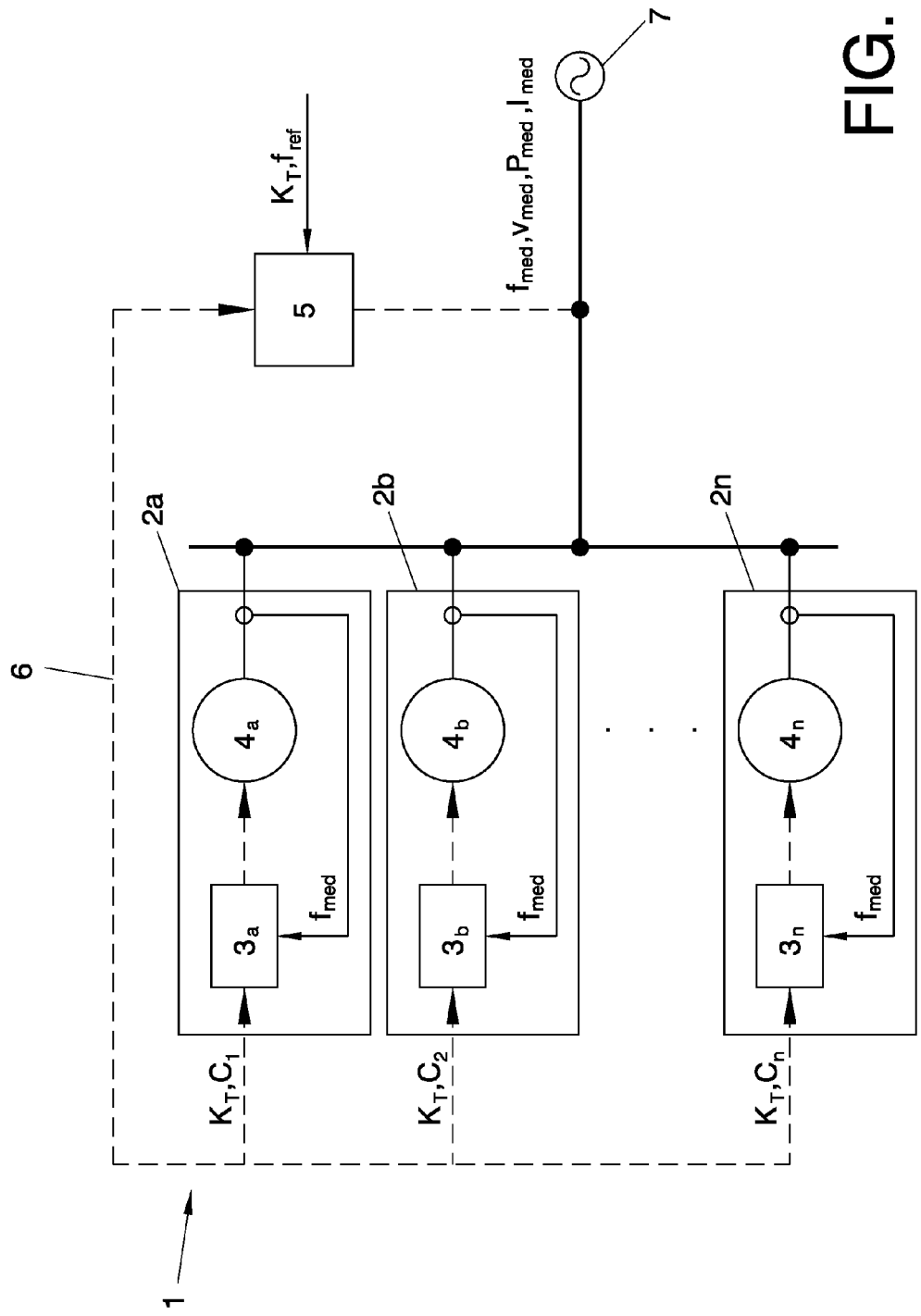
FIG. 2 shows an example of a wind farm according to the present invention.

FIG. 2 shows a schematic view of the generating plant (1) according to the present invention, in this example a wind farm (1), formed by a set of generating units (2), in this example wind turbines (2). A communication network (6) established between a central control unit (5) of the wind farm (1) and each of the wind turbines (2) allows transmission of the respective first parameters, as well as the power output variation requirement ($K_T$) imposed by the grid operator (7) and the reference frequency ($f_{ref}$), as required.

The central control unit (5) could send each of the wind turbines (2) a first parameter $K_i$ indicative of the respective contribution of each wind turbine (2) to the power variation of the wind farm (1) and of the power variation requirement of the wind farm (1) in the event of a change in frequency. However, in the present example the dynamic contribution value ($C_i$) is used as a first parameter.

Figure 3:
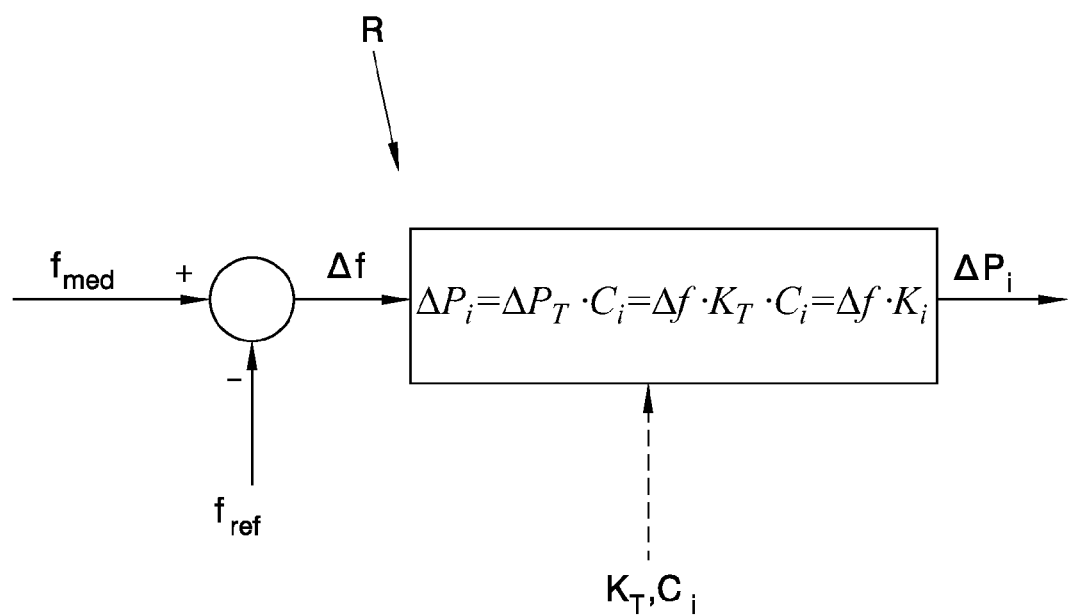
FIG. 3 shows an active power regulator according to the present invention.

Each wind turbine (2), in turn, comprises a power regulator (3) connected to the generator (4) (the term "generator" (4) is understood to include not only the generator strictly speaking, but also multiple auxiliary and control elements known in the state of the art). The power regulator (3), which is shown in greater detail in FIG. 3, calculates the active power variation command based on the corresponding dynamic contribution ($C_i$) value and measured frequency deviation ($f_{med}$) with respect to reference frequency ($f_{ref}$), which is subsequently sent to the generator (4).

Therefore, in the present example the dynamic contribution ($C_1$) value and active power variation requirement ($K_T$) of each wind turbine (2) is imposed by the grid operator (7). Provided that the frequency measured ($f_{med}$) by the wind turbine (2) falls within a certain admissible reference frequency ($f_{ref}$) range (said range has not been represented in FIG. 1 for the sake of simplicity), the active power generated will not be modified. However, when the measured frequency ($f_{med}$) deviates from the reference frequency ($f_{ref}$), each wind turbine (2) has all the necessary information to modify its generated active power instantly, the variation in total power output ($\Delta P_T$) at wind farm (1) level being coordinated by the different dynamic variation values previously sent by the central control unit (5).

For example, let us suppose that the wind farm (1) represented in FIG. 2 comprises ten wind turbines (2) of 2 MW each and that the initial dynamic contribution values ($C_i$) of the first four wind turbines (2) are $C_a=C_b=C_c=C_d=25\%$ and the values ($C_i$) of the rest of the wind turbines (2) are null. In this case, a drop in grid frequency (7) would immediately be detected by the wind turbines (2) through the frequency measured ($f_{med}$) and used by the corresponding active power regulators (3), together with the corresponding dynamic contribution values ($C_i$), previously updated, to calculate the corresponding increase in active power in each case. In this case, the increase in power output of the four first wind turbines (2) would be $\Delta P_a=\Delta P_b=\Delta P_c=\Delta P_c=0.25 \cdot \Delta P_T$ and the variations in power output $\Delta P_i$ of the rest of the wind turbines would be null, thereby achieving the variation in farm power output $\Delta P_T$ required by the grid operator.

In this example, the central control unit (5) can update the dynamic contribution values ($C_1$) of the wind turbines (2) or the required variation in active power ($K_T$) imposed by the operator at any time, whereupon the new values are stored until a new change is produced. Continuing with the preceding example, a contingency could occur in the first wind turbine ($2_a$) at any time which would require disconnection for maintenance thereof. The control unit (5) would then reassign the contribution of said wind turbine ($2_a$) among some of those which have a null dynamic contribution value ($C_i$). The grid operator could also redefine the active power variation requirements ($K_T$) in the event of frequency deviations, in which case the central control unit (5) would update said value in each of the wind turbines (2).

Management of the wind farm (1) in relation to the second parameters or static contribution values ($C_{i\_stat}$) is carried out in a very similar way. Initially, each wind turbine (2) has a stored static contribution value ($C_{i\_stat}$) and limits its generated active power accordingly. Given that the sum of the static contribution ($C_{i\_stat}$) values distributed among the wind turbines (2) is the unit, the value of the total power output reserve ($\Delta P_{T\_stat}$) at wind farm (1) level is known at all times. In the event of changes, the central control unit (5) sends each wind turbine (2) the new values.

As explained earlier, the communication network (6) can also be used for the wind turbines (2) to send the central control unit (5) information on operating parameters in relation to its current status or regarding available power at a given time. Therefore, a specific wind turbine (2) could, for example, inform the central control unit (5) of an imminent malfunction of its bearings, upon which the central control unit (5) releases said wind turbine (2) from its responsibilities as regards static and dynamic contribution.

Figure 4:
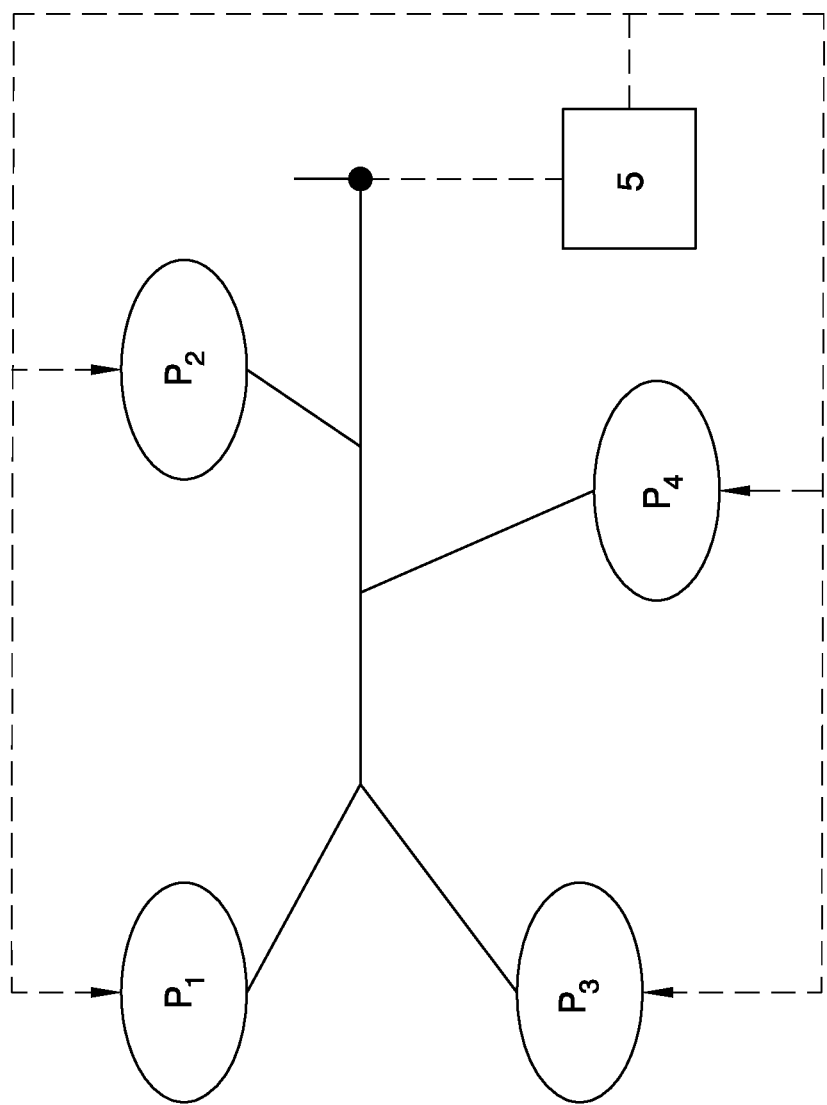
FIG. 4 shows a system where each generating unit is a wind farm and where the generating plant is a group of wind farms.

FIG. 4 shows a case where each generating unit is a complete wind farm ($P_1$, $P_2$, $P_3$, $P_4$) and the generating plant is a group of wind farms. In this case, the central control unit (5) will assign first and second parameters to each wind farm (1).

Figure 5:
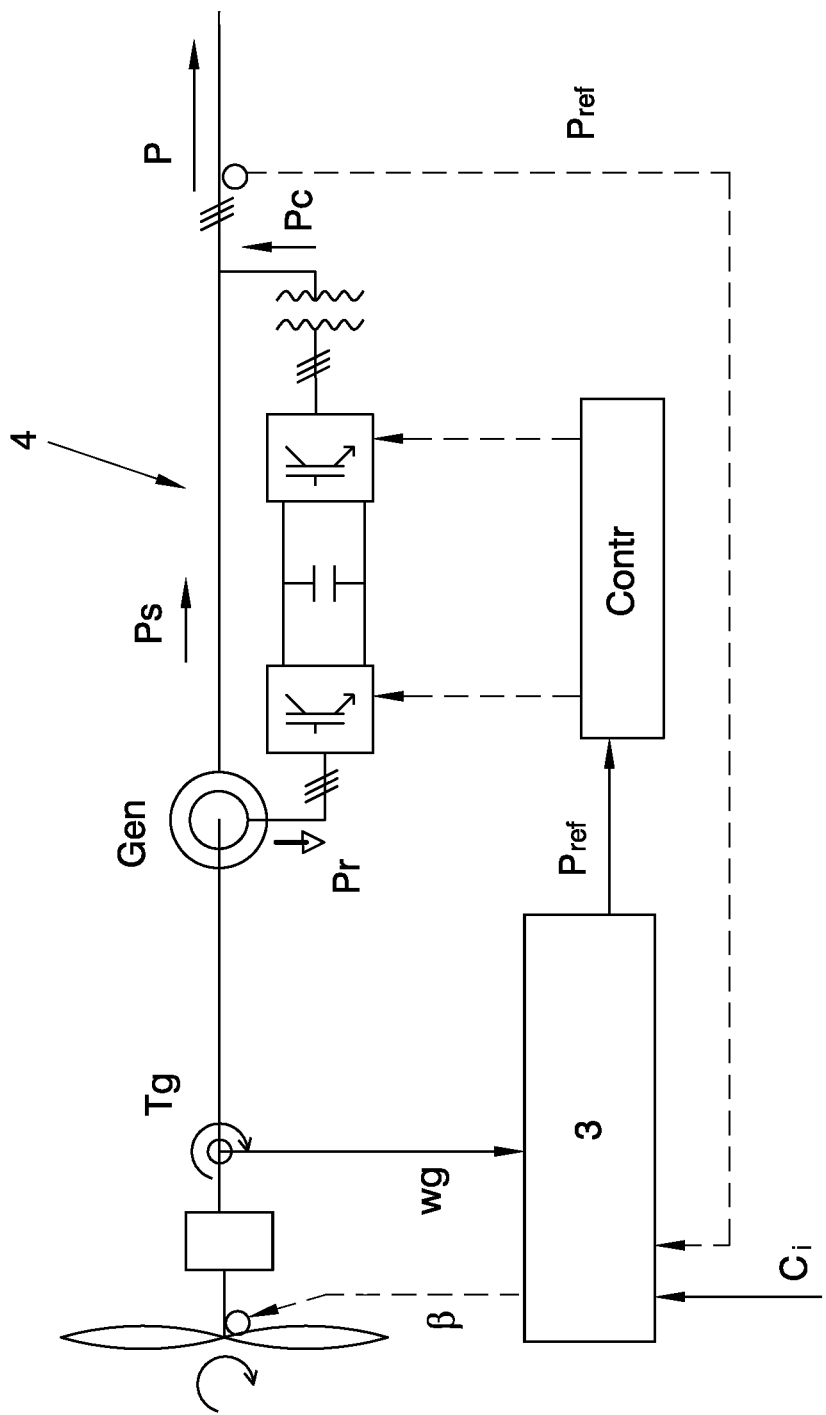
FIG. 5 shows a schematic view of a double-fed asynchronous wind turbine controlled according to the process of the invention.
Figure 6:
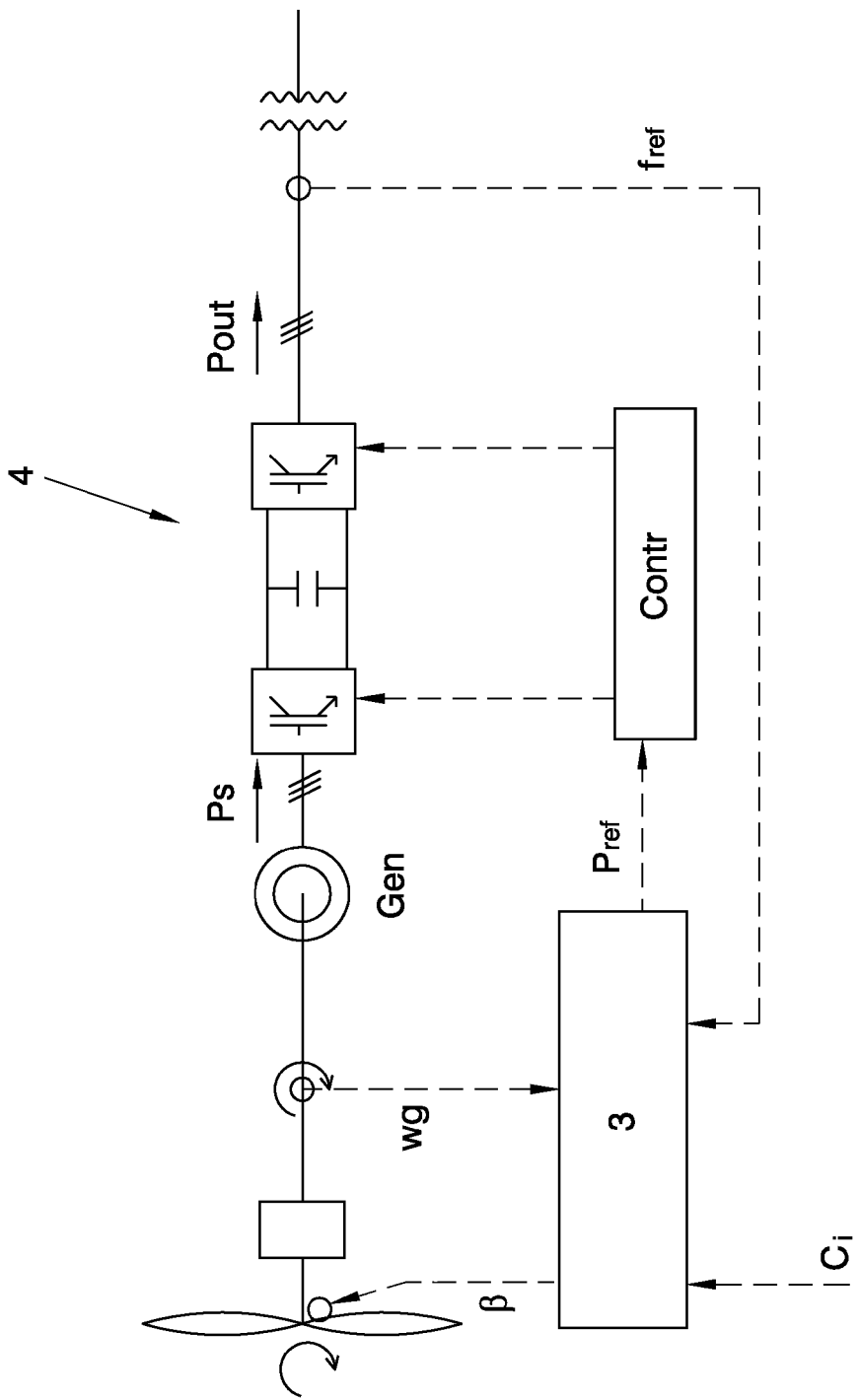
FIG. 6 shows a schematic view of a wind turbine with total power converter controlled according to the process of the invention.

Finally, FIGS. 5 and 6 show examples of a double-fed asynchronous wind turbine (DFIG) and a wind turbine with total power converter that implement the process of the invention.

The invention claimed is:

1. Process for use in a distributed power generation plant (1) formed by at least two generating units (2), the process comprising:
   prior to a deviation in grid frequency, calculating by means of a central control unit of the generating plant connected to each generating unit, a first parameter representative of a respective contribution of said generating unit to a requirement in total active power variation of the generating plant if a potential grid frequency event occurs, where the first parameter is selected from the group consisting of $K_i$, $C_i$, or a combination thereof,
   sending the first parameter to said generating unit,
   updating an active power regulator of each generating unit with the first parameter, and
   calculating in response to the deviation in grid (7) frequency, by means the active power regulator of the generating unit, an active power variation command based on the first parameter, and
   wherein the process controls active power generated by the distributed power generation plant.

2. Process, according to claim 1, where a relationship between the active power variation command of the generating units (2) and the requirement in total active power variation of the generating plant (1) is calculated, where the first parameter is defined as said relationship, and where the first parameter is $C_i$.

3. Process, according to claim 1, where a relationship between the active power variation command of the generating units (2) and the deviation in grid frequency (7) is calculated, where the first parameter is defined as said relationship, and where the first parameter is $K_i$.

4. Process, according to claim 3, where the first parameter is calculated in accordance with the expression $K_i = K_T \cdot C_i$, where $K_T$ is the requirement in total active power variation, $K_i$ is the first parameter, and $C_i$ represents a relationship that between the active power variation parameter of the generating units (2) and the requirement in total active power variation of the generating plant (1).

5. Process, according to claim 2, where the central control unit (5) of the plant (1) modifies the first parameter of the generating units (2) when changes are produced in at least one operating condition of said generating units (2).

6. Process, according to claim 1, where variation in total active power of the generating plant (1) is defined as a percentage of available power of the generating plant (1), where the generating plant (1) is capable of generating a maximum power and where available power is the maximum power that said generating plant (1) can generate at a given time.

7. Process, according to claim 1, where each generating unit (2) calculates an active power static reduction command generated based on a second parameter stored in said generating unit (2), said second parameter being representative of a respective contribution of said generating unit (2) to a static reduction in the requirement in total active power variation of the generating plant, whereupon the central control unit (2) updates the second parameter when changes are produced therein.

8. Process, according to claim 7, where a relationship between the active power static reduction command of a generating unit (2) and the static reduction in the requirement in total active power variation is calculated, and where the second parameter is defined as said relationship.

9. Process, according to claim 7, where the static reduction in the requirement of total active power variation of the generating plant (1) is defined as a percentage of available power, the generating plant (1) is capable of generating a maximum power and where available power is the maximum power that the generating plant (1) can generate at a given time.

10. Process, according to claim 7, where the first parameter is $C_i$ and where the second parameter and the first parameter are identical.

11. Process, according to claim 1, where the generating unit (2) is a wind farm and the generating plant (1) is a group of wind farms.

12. Process, according to claim 1, where the generating units (2) are wind turbines and the generating plant (1) is a wind farm.

13. Process, according to claim 7, where the generating units (2) are wind turbines and the generating plant (1) is a wind farm, and where the second parameter and the first parameter are determined based on wind turbine (2) operating parameters.

14. Process, according to claim 13, where:
   the wind turbines (2) calculate an amount of estimated power available in each wind turbine (2) based on wind speed, wind turbine (2) rotational speed, generated power and blade pitch angle position measurements and/or blade power capture coefficients, and where
   the wind turbines (2) send the central control unit (5) a signal indicative of the amount of estimated power available in each wind turbine (2).

15. Process, according to claim 14, where the wind turbines (2) calculate updated blade power capture coefficients when both the active power variation command and the active power static reduction command are null.

16. Process, according to claim 12, where a first group of wind turbines (2) of the wind farm communicates an amount of estimated power available in each wind turbine in the first group of wind turbines (2) to the central control unit (5) by performing a series of operations, the operations comprising:

sending a command for calculating available power from the control unit (5) to said first group of wind turbines (2) which are functioning in reserve mode;

sending updated static reduction coefficient commands from the control unit (5) to wind turbines (2) on the wind farm that are not part of the first group of wind turbines in order to compensate for deviations in total wind farm power output;

the first group of wind turbines (2) switches from operation in reserve mode to operation in normal mode for a pre-determined period of time in order to obtain an estimate of available power; and each wind turbine from said first group of wind turbines (2) sends the central control unit (5) a filtered power measurement, corresponding to the estimate of available power in each wind turbine (2) that is part of the first group of wind turbines.

17. A wind turbine (2) comprising:

a power generator connectable to a central control unit (5) of a wind farm (1), a power converter connected to the power generator and to a power grid, a means for measuring a power grid frequency, and a control unit, which in turn comprises:

a power regulator (3) that calculates an active power variation command in accordance with a deviation between a reference frequency and a measured frequency, characterised in that the power regulator (3) is configurable and wherein configuration is carried out in accordance with a first parameter received from a central control unit (5) of the wind farm (1) indicative of the wind turbine's respective contribution to variation in total wind farm power output, where the first parameter is selected from the group consisting of $K_i$, $C_i$, or a combination thereof, and where the power regulator sends the active power variation command to the power generator.

18. A wind farm (1) formed by at least two wind turbines (2), according to claim 17, the wind farm comprising a communication network (6) that connects a central control unit (5) of the wind farm (1) to the power regulators (3) of the at least two wind turbines (2), where the communication network is configured to calculate new values of the first parameter indicative of the contribution to variation in total power output from the central control unit (5) and where the communication network sends the new values of the first parameter to the power regulators (3) of said at least two wind turbines (2).

19. Process, according to claim 1, further comprising updating the value of the first parameter when conditions under which the wind turbine operates undergo at least one change.

* * * * *